United States Patent
Wang et al.

(10) Patent No.: US 10,838,499 B2
(45) Date of Patent: Nov. 17, 2020

(54) FINGER-MOUNTED DEVICE WITH SENSORS AND HAPTICS

(71) Applicant: Apple Inc., Cupertino, CA (US)

(72) Inventors: Paul X. Wang, Cupertino, CA (US); Alex J. Lehmann, Sunnyvale, CA (US); Michael J. Rockwell, Palo Alto, CA (US); Michael Y. Cheung, Cupertino, CA (US); Ray L. Chang, Saratoga, CA (US); Hongcheng Sun, San Ramon, CA (US); Ian M. Bullock, Los Altos, CA (US); Kyle J. Nekimken, San Jose, CA (US); Madeleine S. Cordier, San Francisco, CA (US); Seung Wook Kim, Cupertino, CA (US); David H. Bloom, San Francisco, CA (US); Scott G. Johnston, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/015,043

(22) Filed: Jun. 21, 2018

(65) Prior Publication Data

US 2019/0004604 A1    Jan. 3, 2019

Related U.S. Application Data

(60) Provisional application No. 62/526,792, filed on Jun. 29, 2017.

(51) Int. Cl.
*G06F 3/01* (2006.01)
*G06F 3/0481* (2013.01)
(Continued)

(52) U.S. Cl.
CPC ............ *G06F 3/016* (2013.01); *G01P 15/003* (2013.01); *G02B 27/017* (2013.01); *G06F 3/014* (2013.01);
(Continued)

(58) Field of Classification Search
CPC .......... G06F 3/016; G06F 3/014; G06F 3/017; G06F 3/0346; G06F 3/0426;
(Continued)

(56) References Cited

U.S. PATENT DOCUMENTS

| 5,581,484 A | 12/1996 | Prince |
| 5,631,861 A | 5/1997 | Kramer |

(Continued)

FOREIGN PATENT DOCUMENTS

| CN | 104049739 A | 9/2014 |
| CN | 104281257 A | 1/2015 |

(Continued)

OTHER PUBLICATIONS

Author: Cruz-Hernandez English translation of CN 105739612A Title: Deformable tactile wearables with variable physical properties (Year: 2016).*

(Continued)

*Primary Examiner* — Mandrita Brahmachari
(74) *Attorney, Agent, or Firm* — Treyz Law Group, P.C.; G. Victor Treyz; Kendall W. Abbasi

(57) ABSTRACT

A finger-mounted device may include finger-mounted units. The finger-mounted units may each have a body that serves as a support structure for components such as force sensors, accelerometers, and other sensors and for haptic output devices. The body may have sidewall portions coupled by a portion that rests adjacent to a user's fingernail. The body may be formed from deformable material such as metal or may be formed from adjustable structures such as sliding (Continued)

body portions that are coupled to each other using magnetic attraction, springs, or other structures. The body of each finger-mounted unit may have a U-shaped cross-sectional profile that leaves the finger pad of each finger exposed when the body is coupled to a fingertip of a user's finger. Control circuitry may gather finger press input, lateral finger movement input, and finger tap input using the sensors and may provide haptic output using the haptic output device.

32 Claims, 17 Drawing Sheets

(51) Int. Cl.
| | | |
|---|---|---|
| G06F 3/042 | (2006.01) | |
| G06F 3/0488 | (2013.01) | |
| G06T 19/00 | (2011.01) | |
| G01P 15/00 | (2006.01) | |
| G02B 27/01 | (2006.01) | |
| G06F 3/0346 | (2013.01) | |

(52) U.S. Cl.
CPC ............ *G06F 3/017* (2013.01); *G06F 3/0346* (2013.01); *G06F 3/0426* (2013.01); *G06F 3/04815* (2013.01); *G06F 3/04886* (2013.01); *G06T 19/006* (2013.01); *G06F 2203/0331* (2013.01)

(58) Field of Classification Search
CPC ............ G06F 3/04815; G06F 3/04886; G06F 2203/0331; G01P 15/003; G02B 27/017; G06T 19/006
See application file for complete search history.

(56) References Cited

U.S. PATENT DOCUMENTS

| | | | |
|---|---|---|---|
| 6,388,247 B2 | 5/2002 | Asada et al. | |
| 8,368,641 B2 | 2/2013 | Tremblay et al. | |
| 8,610,548 B1 | 12/2013 | Provancher | |
| 8,724,861 B1 | 5/2014 | Sun | |
| 8,994,827 B2 | 3/2015 | Mistry et al. | |
| 9,104,271 B1 | 8/2015 | Adams et al. | |
| 9,110,505 B2 | 8/2015 | Mastandrea | |
| 9,711,060 B1* | 7/2017 | Lusted | G09B 19/00 |
| 2003/0214481 A1 | 11/2003 | Xiong | |
| 2005/0052412 A1 | 3/2005 | McRae et al. | |
| 2006/0103634 A1 | 6/2006 | Kim et al. | |
| 2007/0030246 A1* | 2/2007 | Tremblay | G06F 3/011 |
| | | | 345/156 |
| 2009/0096746 A1 | 4/2009 | Kruse et al. | |
| 2009/0153365 A1 | 6/2009 | Salsedo et al. | |
| 2009/0153477 A1 | 6/2009 | Saenz | |
| 2009/0278798 A1 | 11/2009 | Kim et al. | |
| 2009/0287898 A1 | 11/2009 | Kim et al. | |
| 2010/0103106 A1* | 4/2010 | Chui | G06F 3/017 |
| | | | 345/166 |
| 2010/0231505 A1* | 9/2010 | Iwata | G06F 3/04886 |
| | | | 345/156 |
| 2011/0210931 A1 | 9/2011 | Shai | |
| 2011/0213664 A1 | 9/2011 | Osterhout et al. | |
| 2012/0249419 A1 | 10/2012 | Bronner et al. | |
| 2013/0151960 A1 | 6/2013 | Wiertlewski et al. | |
| 2013/0162415 A1* | 6/2013 | Kim | G06F 3/016 |
| | | | 340/407.1 |
| 2014/0063060 A1* | 3/2014 | Maciocci | G06F 3/011 |
| | | | 345/633 |
| 2015/0248160 A2 | 9/2015 | Provancher et al. | |
| 2015/0277559 A1 | 10/2015 | Vescovi et al. | |
| 2016/0287165 A1* | 10/2016 | Abreu | A61B 5/0015 |
| 2016/0295989 A1* | 10/2016 | Hakeem | A45D 31/00 |
| 2016/0313798 A1 | 10/2016 | Connor | |
| 2017/0003762 A1 | 1/2017 | Ishii et al. | |
| 2017/0045948 A1 | 2/2017 | Nattukallingal | |
| 2017/0090666 A1* | 3/2017 | Pahud | G06F 3/0416 |
| 2017/0143087 A1* | 5/2017 | Cunningham | A45C 11/00 |
| 2017/0188947 A1* | 7/2017 | Connor | A61B 5/6803 |
| 2017/0192493 A1* | 7/2017 | Ofek | G06F 3/005 |
| 2017/0212552 A1 | 7/2017 | Stotler | |
| 2017/0235332 A1 | 8/2017 | Von Badinski et al. | |
| 2017/0277367 A1* | 9/2017 | Pahud | G06F 3/04883 |
| 2017/0296363 A1* | 10/2017 | Yetkin | A61F 2/72 |
| 2017/0330471 A1* | 11/2017 | Subiakto | G09B 5/065 |
| 2017/0357320 A1* | 12/2017 | Chaudhri | G06F 3/0412 |
| 2017/0367590 A1* | 12/2017 | Sebe | G06K 9/00268 |
| 2018/0286189 A1* | 10/2018 | Motamedi | G08B 6/00 |

FOREIGN PATENT DOCUMENTS

| | | |
|---|---|---|
| CN | 105739612 A | 7/2016 |
| CN | 105739676 A | 7/2016 |
| CN | 106155306 A | 11/2016 |
| GB | 2442973 A | 4/2008 |
| JP | 2001104256 A | 4/2001 |
| JP | 2008171409 A | 7/2008 |
| JP | 2013003782 A | 1/2013 |
| JP | 2014142751 A | 8/2014 |
| JP | 2015521303 A | 7/2015 |
| JP | 2015219887 A | 12/2015 |
| JP | 2016033815 A | 3/2016 |
| JP | 2016118929 A | 6/2016 |
| KR | 1020140016122 A | 2/2014 |
| WO | 2012176610 A1 | 12/2012 |

OTHER PUBLICATIONS

Haptic device to present contact sensation (Year: 2009).*
NPL survey of finger augmentation devices (Year: 2015).*
Hutson, Finger devices let users 'touch' virtual objects, Science, AAAS, Apr. 25, 2017, 4 pages.
Girard et al., HapTip: Displaying Haptic Shear Forces at the Fingertips for Multi-Finger Interaction in Virtual Environments, Frontiers in ICT, vol. 3, Article 6, Apr. 2016, 15 pages.
Heo et al., "Finger Flexion Force Sensor based on Volar Displacement of Flexor Tendon", 2012 IEEE International Conference on Robotics and Automation, RiverCentre, Saint Paul, Minnesota, USA, May 14-18, 2012, pp. 1392-1397.

* cited by examiner

FINGER-MOUNTED DEVICE WITH SENSORS AND HAPTICS

This application claims the benefit of provisional patent application No. 62/526,792, filed on Jun. 29, 2017, which is hereby incorporated by reference herein in its entirety.

FIELD

This relates generally to electronic devices, and, more particularly, to wearable electronic devices.

BACKGROUND

Electronic equipment such as computers and head-mounted display systems are sometimes controlled using input-output devices such as gloves. A glove may have sensors that detect user hand motions. The user hand motions can be used in controlling electronic equipment.

The use of wearable devices to gather input for controlling electronic equipment can pose challenges. If care is not taken, a device such as a glove may affect the ability of a user to feel objects in the user's surroundings, may be uncomfortable to use, or may not gather suitable input from the user.

SUMMARY

A finger-mounted device may include finger-mounted units coupled to control circuitry. The control circuitry may wirelessly transmit information gathered with the finger mounted units to an external device to control the external device. The control circuitry may also use the finger-mounted units to provide a user's fingers with feedback such as haptic feedback. For example, the control circuitry may supply haptic output to a user's fingers based on wirelessly received information from the external device. The haptic output may correspond to virtual reality or augmented reality haptic output.

The finger-mounted units may each have a body. The body serves as a support structure for components such as force sensors, accelerometers, and other sensors and for haptic output devices. During operation, a user may wear the finger mounted units on the tips of the user's fingers while interacting with external objects.

The body of each finger-mounted unit may have sidewall portions coupled by portion that rests adjacent to a user's fingernail. A user's fingertip may be received between the sidewall portions. The body may be formed from deformable material such as metal or may be formed from adjustable structures such as sliding body portions that are coupled to each other using magnetic attraction, springs, or other structures. This allows the body of the finger-mounted unit to be adjusted to accommodate different finger sizes.

The body of each finger-mounted unit may have a U-shaped cross-sectional profile that leaves the finger pad of each finger exposed when the body is coupled to a fingertip of a user's finger. The control circuitry may gather finger press input, lateral finger movement input, and finger tap input using the sensors and may provide haptic output using the haptic output device.

DETAILED DESCRIPTION

Wearable electronic devices may be used to gather input from a user and may be used to provide haptic output or other output to the user. For example, a wearable device such as a finger-mounted device may be used to gather input from a user's fingers as the user interacts with surfaces in the user's environment and may be used to provide clicks and other haptic output during these interactions. The input that is gathered in this way may include information on how firmly a user is pressing against objects (finger press input), finger tap input associated with light taps of a user's finger against a surface, lateral finger movement information such as shear force information indicating how firmly a user is pressing their finger sideways on a surface, and other user input. Haptic output may be provided to the user to confirm to the user that a light tap input has been recognized or to otherwise provide feedback to the user. The haptic feedback may provide the user with a sensation of tapping on a physical keyboard or other input device with a movable button member even when the user is tapping on a hard flat surface such as a tabletop. The haptic output provided with the wearable electronic device to the user may be virtual reality haptic output or augmented reality haptic output that is provided while a user is wearing a head-mounted display or other device that creates a virtual reality or augmented reality environment for a user.

To allow the user to feel real-world objects accurately, the finger-mounted device may have a U-shaped cross-sectional profile or other shape that allows underside portions of the user's fingertips to be exposed to the environment. Sensor components for the finger-mounted device may be formed from force sensors, optical sensors, and other sensors. Haptic output devices may include piezoelectric actuators and other components that provide haptic output. In some configurations, a piezoelectric device or other component may be used both to provide haptic output (when driven with an output signal) and to gather force sensor input.

A finger-mounted device may be used to control a virtual reality or augmented reality system, may provide a user with the sensation of interacting on a physical keyboard when the user is making finger taps on a table surface (e.g., a virtual keyboard surface that is being displayed in alignment with the table surface using a head-mounted display), may allow a user to supply joystick-type input using only lateral movement of the user's fingertips, may gather force sensor measurements (user finger press force measurements) that are used in controlling other equipment, and/or may be used in gathering input and providing a user with haptic output in other system environments.

Figure 1:
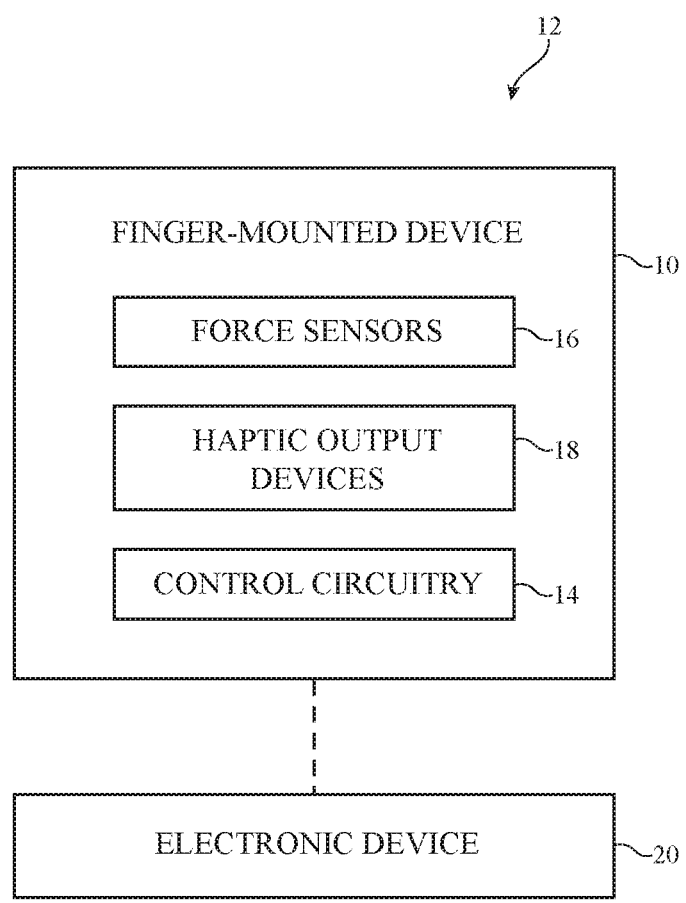
FIG. 1 is a schematic diagram of an illustrative device such as a finger-mounted device in accordance with an embodiment.

FIG. 1 is a diagram of an illustrative system that includes a wearable device such as a finger-mounted device. As shown in FIG. 1, system 12 may include a finger-mounted device such as device 10 that interacts with electronic equipment such as electronic device 20. Finger-mounted device 10 may include sensors such as force sensors 16, haptic output devices 18, and control circuitry 14. Components such as these may be mounted on the body parts of a user (e.g., on a user's fingertips) using housing structures (sometimes referred to as body structures or body members). Housing structures may be formed for portions of device 10 that reside on one or more fingers. For example, device 10 may include a separate body member and associated components for each of multiple different fingers of a user. The housing structures may be formed from metal, polymer, fabric, glass, ceramic, other materials, or combinations of these materials. In some configurations, wireless or wired links may be used to route signals to and from fingertip components to other portions of device 10 (e.g., a portion of device 10 that is located on the rear of a user's hand, etc.).

If desired, device 10 may include input-output devices other than force sensors 14. For example, device 10 may include optical sensors (e.g., sensors that detect light or sensors that emit light and detect reflected light), image sensors, status indicator lights and displays (e.g., light-based components such as light-emitting diodes that emit one or more regions of light, pixel arrays for displaying images, text, and graphics, etc.), may include buttons (e.g., power buttons and other control buttons), audio components (e.g., microphones, speakers, tone generators, etc.), touch sensors, sensors for detecting position, orientation, and/or motion (e.g., accelerometers, magnetic sensors such as compass sensors, gyroscopes, inertial measurement units that contain some or all of these sensors), muscle activity sensors (EMG) for detecting finger actions, and/or other circuitry for gathering input.

Haptic output devices 18 may be electromagnetic actuators (e.g., vibrators, linear solenoids, etc.), may be piezoelectric devices (e.g., piezoelectric devices that are separate from force sensing piezoelectric devices in device 10 and/or piezoelectric devices that serve both as haptic output devices and as force sensors), may be components that produce haptic output using heat-induced physical changes (e.g., by heating shape memory alloys), may be electroactive polymer components, or may be other suitable components that produce haptic output.

Control circuitry 14 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 14 may be used to gather input from sensors and other input devices and may be used to control output devices such as haptic output devices 18. The processing circuitry may be based on one or more microprocessors, microcontrollers, digital signal processors, baseband processors and other wireless communications circuits, power management units, audio chips, application specific integrated circuits, etc.

Control circuitry 14 may include antennas, radio-frequency transceiver circuitry, and other wireless communications circuitry and/or wired communications circuitry to support communications with external equipment such as electronic device 20. Control circuitry 14 may, for example, support bidirectional communications with device 20 over a wireless local area network link, a cellular telephone link, or other suitable wired or wireless communications link (e.g., a Bluetooth® link, a WiFi® link, a 60 GHz link, etc.). Device 20 may be, for example, a tablet computer, a desktop computer, a cellular telephone, a head-mounted device such as a head-mounted display, wearable equipment, a wrist watch device, a set-top box, a gaming unit, a television, a display that is coupled to a desktop computer or other electronic equipment, a voice-controlled speaker, home automation equipment, an accessory (e.g., ear buds, a removable case for a portable device, etc.), or other electronic equipment. Device 20 may include input-output circuitry such as sensors, buttons, cameras, displays, and other input-output devices and may include control circuitry (e.g., control circuitry such as control circuitry 14) for controlling the operation of device 20. Control circuitry 14 may include wireless power circuitry (e.g., a coil and rectifier for receiving wirelessly transmitted power from a wireless power transmitting device that has a corresponding wireless power transmitting circuit with a coil). During wireless power transmission operations (e.g., inductive power transmission), wireless power may be provided to device 20 and distributed to load circuitry in device 20 (e.g., circuitry 14, devices 18, sensors 16, etc.). Circuitry 14 may include energy storage circuitry (e.g., batteries and/or capacitors) for storing power from a wired power device and/or a wireless power transmitting device.

Device 20 may be coupled to one or more additional devices in system 12. For example, a head-mounted device with a display may be used for displaying visual content (virtual reality content and/or augmented reality content) to a user. This head-mounted device may be coupled to an electronic device such as a cellular telephone, tablet computer, laptop computer, or other equipment using wired and/or wireless communications links. Devices 20 may communicate with device 10 to gather input (e.g., user finger position information) and to provide output (e.g., using haptic output components in device).

During operation, control circuitry 14 of device 10 may use communications circuitry to transmit user input such as force sensor information and information from other sensors to device 20 to use in controlling device 20. Information from the sensors and other input devices in device 10 and/or information from device 20 may be used by control circuitry 14 in determining the strength and duration of haptic output supplied to the user with haptic output devices 18.

Figure 2:
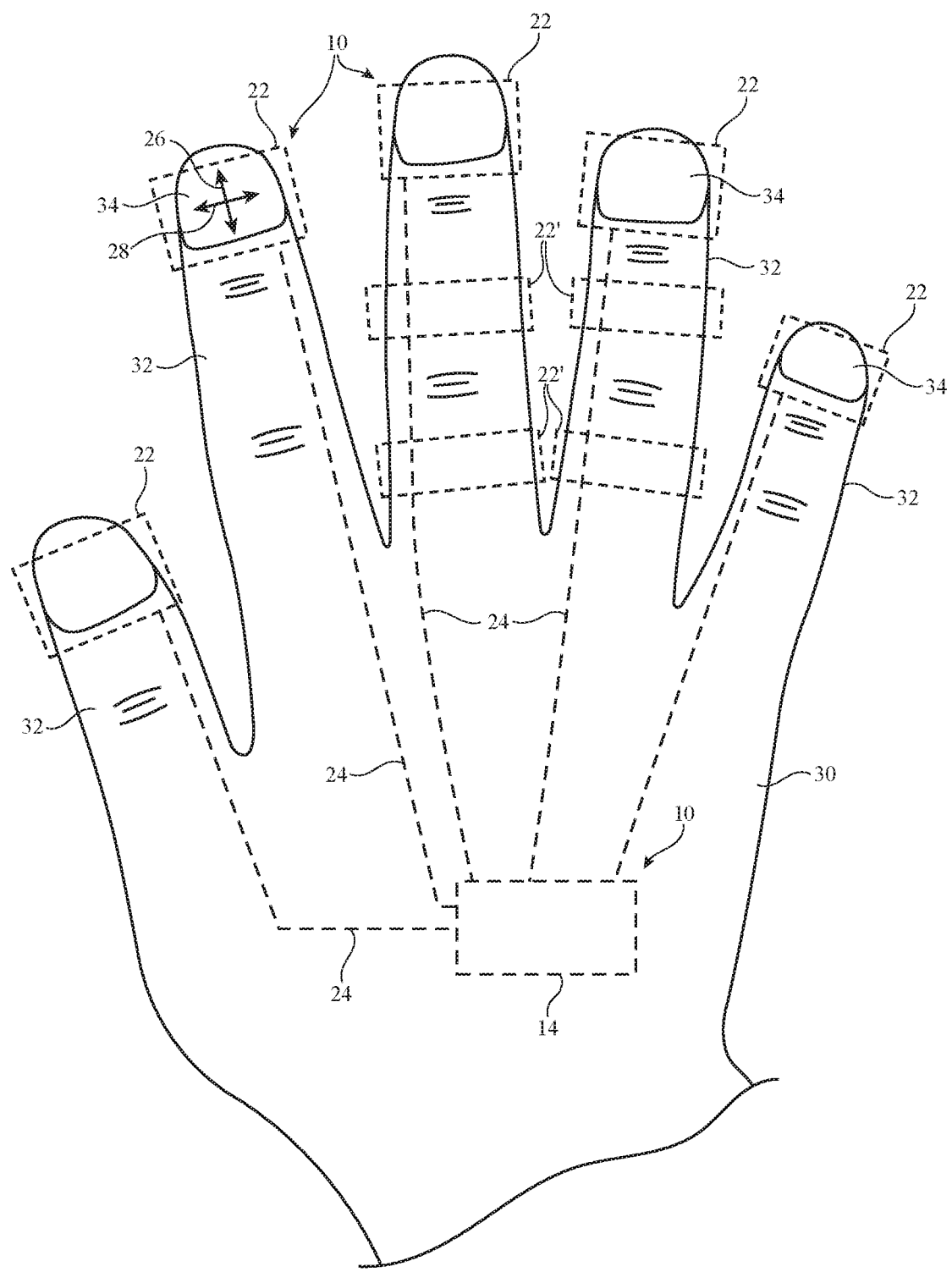
FIG. 2 is top view of a user's hand and illustrative finger-mounted device components on finger tips of the user's hand in accordance with an embodiment.

FIG. 2 is top view of a user's hand and an illustrative finger-mounted device. As shown in FIG. 2, device 10 may be formed from one or more finger-mounted units 22 mounted on fingers 32 of the user. Units 22 may, for example, be mounted on the tips of fingers 32 (e.g., overlapping fingernails 34). Some or all of control circuitry 14 may be contained in units 22 or may be mounted in separate housing structures (e.g., part of a wrist band, a glove, a partial glove such as a fingerless glove or glove in which portions have been removed under the pads of a user's finger tips, etc.). Signal paths such as signal paths 24 may be used in interconnecting the circuitry of units 22 and/or additional circuitry such as control circuitry 14 that is located out of units 22.

Signal paths 24 may include wired or wireless links. Wired paths may be formed, for example, using metal traces on a printed circuit such as a flexible printed circuit, using wires, using conductive strands (e.g. wires or metal-coated polymer strands) in woven, knit, or braided fabric, and/or using other conductive signal lines. In configurations in which some or all of control circuitry 14 is located outside of units 22, signal paths such as signal paths 24 may run across some or all of user's hand 30 to couple the circuitry of units 22 to this control circuitry. Configuration in which control circuitry 10 is located in one or more units 22 and in which these units 22 are interconnected by wired or wireless paths 24 may also be used, if desired.

When units 22 are located on the user's fingertips, components in units 22 may sense contact between the user's fingertips and external surfaces. In some configurations, a user's fingertip (e.g., the pad of the user's fingertip) may contact a surface and, while the fingertip is in contact with the surface, a user may move the fingertip laterally in lateral directions such as lateral directions 28 and 26 of FIG. 2. The lateral movement of the fingertip while the pad of the fingertip is in contact with a surface (e.g., movement of the fingertip in dimensions parallel to the plane of the surface being contacted) may generate shear forces that can be detected by the components of one or more units 22. This allows the user's own fingertip to be used as a pointing device (e.g. to be used as a joystick) that can control an on-screen cursor or other adjustable system feature in a device such as device 20 of FIG. 1. In some configurations, units 22 may be worn on portions of hand 30 other than the fingertips of fingers 32. For example, units 22 may be worn elsewhere along the lengths of fingers 32, as shown by illustrative units 22' of FIG. 2. If desired, units 22 and 22' may be used together in device 10 (e.g., to gather information from multiple finger locations). Illustrative configuration in which units 22 are mounted at the tips of fingers 32 may sometimes be described herein as an example.

Figure 3:
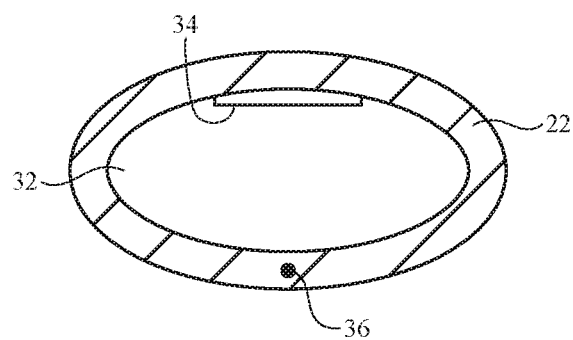
FIG. 3 is a cross-sectional view of an illustrative finger-mounted device on a user's finger in accordance with an embodiment.

Units 22 may partly or completely surround the tips of fingers 32. FIG. 3 is a cross-sectional view of an illustrative finger-mounted device (unit 22) on a user's finger 32 in an arrangement in which the body of unit 22 surrounds finger 32 (e.g., in which unit 22 has portions of the top, sides, and lower finger pad portion of finger 32). Unit 22 of FIG. 3 may, as an example, be formed from a soft elastomeric material, fabric, or other flexible material that allows the user to feel surfaces through unit 22. If desired, sensors, haptic devices, and or other components may be mounted under the pad of finger 32 in locations such as location 36.

If desired, units 22 may have a U-shaped cross-sectional profile so that units 22 cover only the tops and/or sides of the user's fingers while the pads of the user's fingertips are exposed and not covered by any portions of device 10. Units 22 with this type of configuration may allow the user to touch surfaces with the user's own skin, thereby enhancing the user's sensitivity to the environment in which device 10 is being used. For example, units 22 that cover only the tops and sides of a user's fingertips may allow the pads of the user's finger to detect small surface imperfections on a touched surface, slight irregularities in surface texture, and other details that might be obscured in a configuration in which the pads of the user's fingers are covered.

Figure 4:
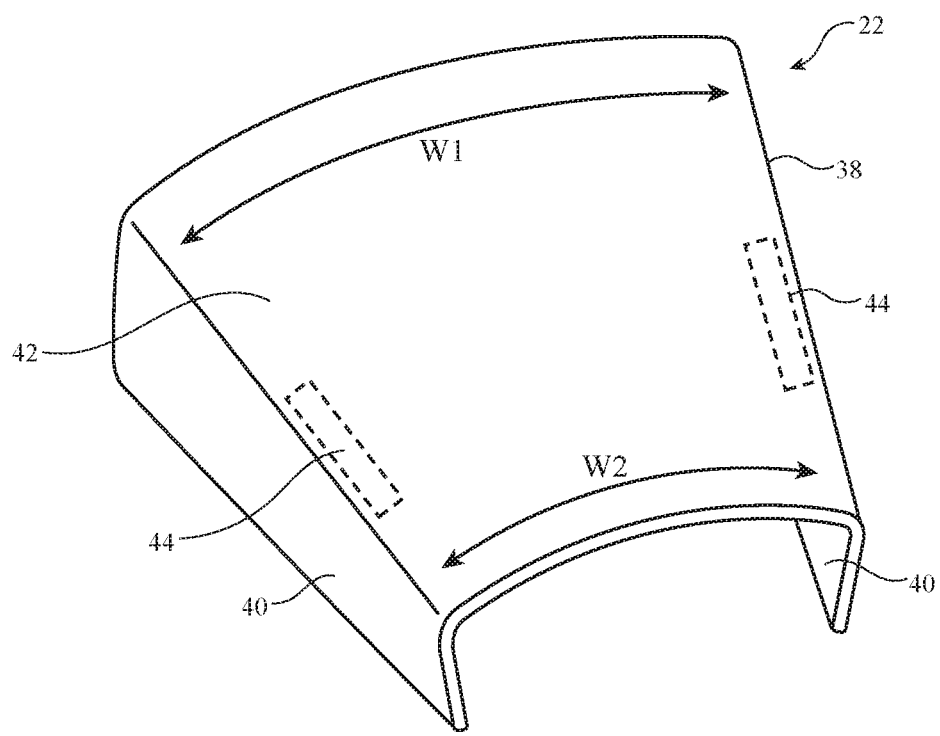
FIG. 4 is a perspective view of an illustrative finger-mounted device in accordance with an embodiment.

FIG. 4 is a perspective view of an illustrative unit 22 for finger-mounted device 10 in which body 38 of unit 22 is configured to only partly surround a user's fingertip. As shown in FIG. 4, body 38 may include side portions such as sidewall portions 40 (e.g., portions that contact the sides of a user's finger) and portions such as coupling portion 42 (e.g., a slightly bowed portion that covers the top of a user's fingertip or, in some configurations, that covers the pad of the user's fingertip at the bottom of the user's fingertip). Portion 42 may support sidewall portions 40 adjacent to opposing left and right sides of a user's finger. Openings such as optional openings 44 may be formed in body 38 to facilitate bending of a metal member or other structure forming body 38. Body 38 may be tapered to facilitate mounting of body 38 on a user's fingertip (e.g., body 38 may have a wider portion of width W1 and a narrower portion for the outermost tip of the user's finger with a width W2 that is less than W1).

Figure 5:
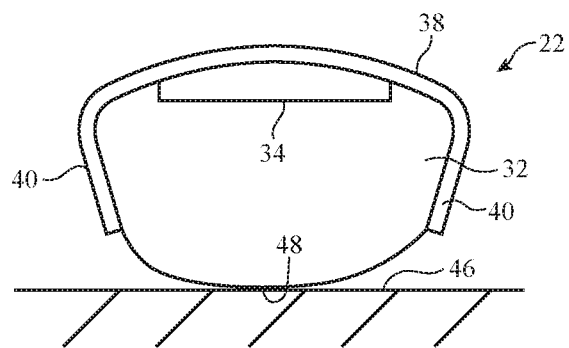
FIGS. 5, 6, and 7 are illustrative views of the tip of a user's finger during use of a finger-mounted device in accordance with an embodiment.

FIG. 5 is an end view of an illustrative unit such as unit 22 of FIG. 5 in a configuration in which a user's finger (e.g., finger pad 48 at the bottom of the tip of finger 32) is resting lightly on an external surface such as surface 46. As shown in FIG. 5, body 38 of unit 22 may have a U-shaped cross-sectional profile that holds body 38 to finger 32 with a friction fit. With this configuration, the open side of U-shaped body 38 may face downward to expose finger pad 48.

Figure 6:
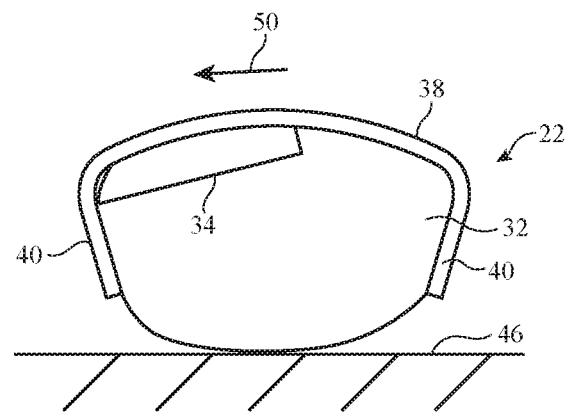

When a user moves finger 32 laterally in direction 50 as shown in FIG. 6, shear forces are generated. Force sensors (e.g., in sidewalls 40) may detect this shear force and may use the detected shear force to measure the user's lateral finger movement.

Figure 7:
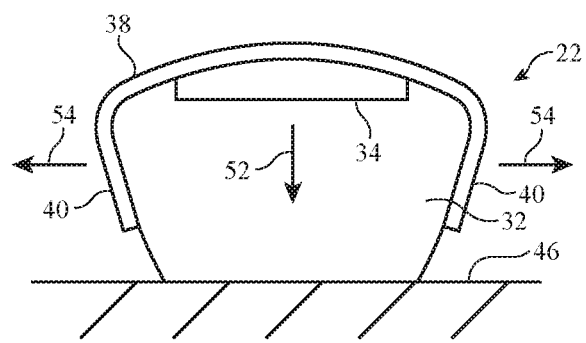

FIG. 7 shows how finger press input force against surface 46 may be measured. When a user presses finger 32 downwardly against surface 46 in direction 52, portions of finger 32 will be forced outwardly in directions 54 (e.g., symmetrically). Force sensors in sidewall portions 40 of body 38 of unit 22 can detect these outward forces and can use this information to quantify the amount of downward force applied in direction 52.

Figure 8:
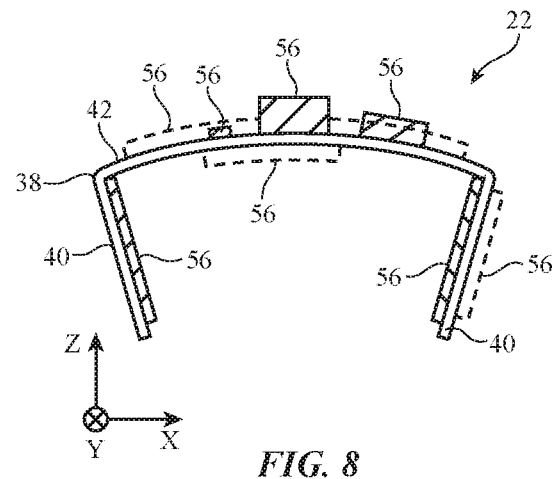
FIG. 8 is a cross-sectional view of an illustrative finger-mounted device in accordance with an embodiment.

FIG. 8 is a cross-sectional view of an illustrative finger-mounted unit showing illustrative mounting locations for electrical components. As shown in FIG. 8, components 56 may be mounted on the inner and/or outer surfaces of body 38 (e.g., on sidewall portions 40 and/or upper portion 42 of body 38). As an example, force sensors may be mounted on sidewall portions 40 to detect finger forces as described in connection with FIGS. 6 and 7. As another example, haptic output devices 18 may be mounted on sidewall portions 40 (e.g., on an outer surface, on an inner surface facing an opposing force sensor on an opposing inner sidewall surface, on the upper or lower surface of portion 42 of body 38, etc.). Components 56 may include an accelerometer or other sensor that detects motion, orientation, and/or position for finger 32. For example, an accelerometer may be located on the upper surface of portion 42 or elsewhere in unit 22. When a user taps lightly on surface 46 (FIG. 7) to provide device 10 with finger tap input, the accelerometer may detect a sudden change in the speed of unit 22 (e.g., a peak in measured acceleration) corresponding to the tap. When both force sensors and accelerometers are present in device 10, device 10 can measure finger press input (downward force), lateral finger motion input (shear forces), and finger tap input (accelerometer output signal peaks).

Other components 56 that may be supported by body 38 include components for wired and/or wireless communications circuitry and/or other circuitry 14 (e.g., circuitry supported by body portion 42), batteries, optical sensors (e.g., light-emitting and light-detecting components on portion 42), a strain gauge (e.g., a strain gauge that extends across some or all of the width of portion 42 and which may optionally be mounted on an upper surface of portion 42 to measure strain resulting from movement of sidewall portions 40 relative to portion 42 and corresponding flattening of the bowed shape of portion 42), and/or light-emitting devices such as light-emitting diodes or passive marker structures on the top of portion 42 or elsewhere in body 38 to facilitate camera-based position monitoring of the locations and/or orientations of units 22 (e.g., position monitoring using image sensors in device 20 or other external equipment).

Figure 9:
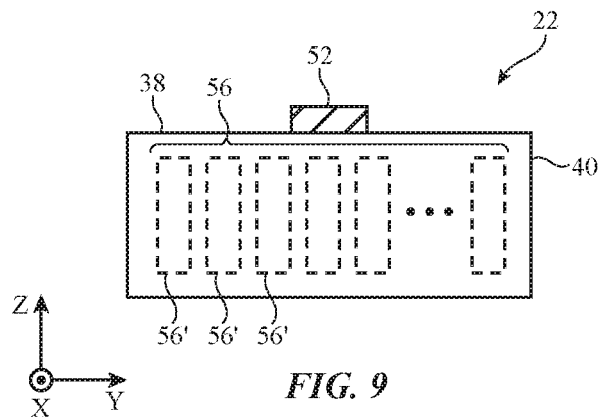
FIG. 9 is a side view of an illustrative finger-mounted device in accordance with an embodiment.
Figure 10:
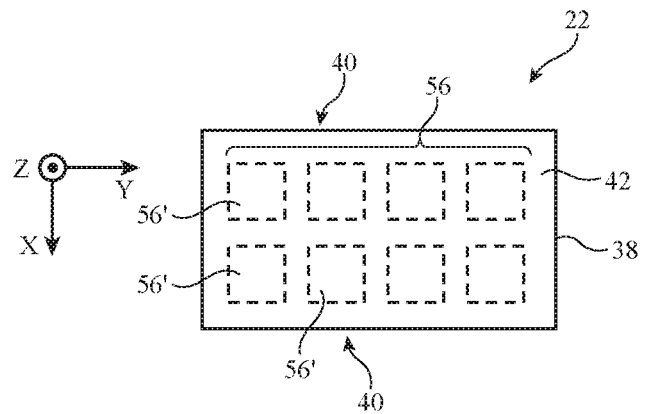
FIG. 10 is a top view of an illustrative finger-mounted device in accordance with an embodiment.

FIG. 9 is a side view of the illustrative finger-mounted unit of FIG. 8. As shown in FIG. 9, sensors or other components 56 may be segmented along the side of body sidewall portion 40 of unit 22. If desired, the sensors or other components 56 supported by body 38 may have multiple subcomponents such as components 56'. For example, a force sensor and/or haptic device on sidewall 40 of FIG. 9 may have multiple components 56' each of which produces a separate respective force sensor measurement and/or each of which produces a separate respective haptic output. This allows more detailed measurements to be made on the forces created during operation (e.g., to help accurately acquire information on the location of a finger press within the tip of the user's finger by comparing where different portions of the user's finger press outwardly in directions 52 of FIG. 7) and allows more detailed haptic feedback to be provided to the user. If desired, multiple sensors such as force sensors and/or multiple haptic output devices or other components 56' may be placed on upper portion 42 of body 38, as shown in FIG. 10.

Figure 11:
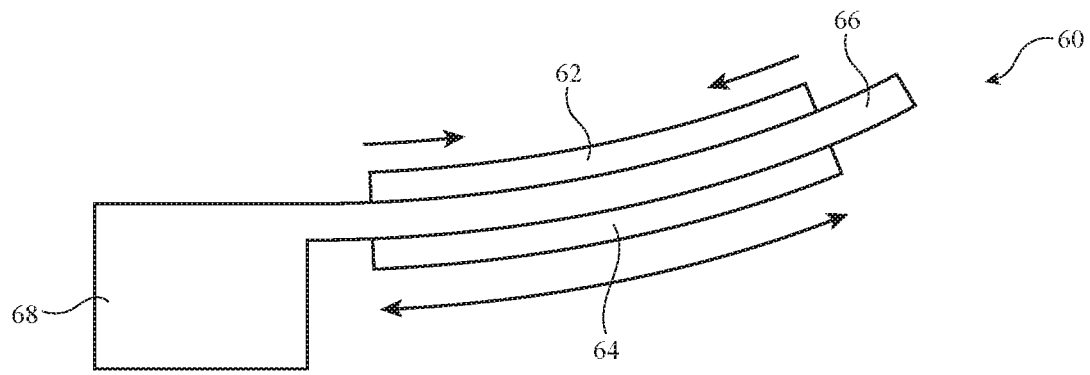
FIG. 11 is a cross-sectional side view of an illustrative piezoelectric beam device in accordance with an embodiment.
Figure 12:
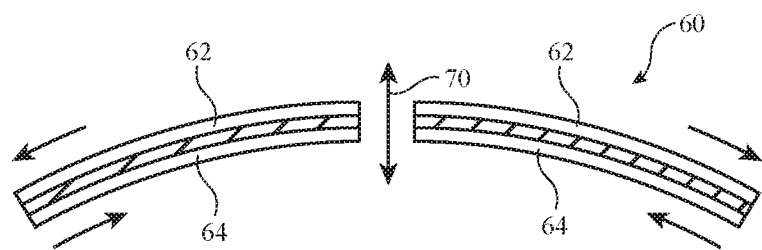
FIG. 12 is a cross-sectional side view of an illustrative piezoelectric disk device in accordance with an embodiment.

Piezoelectric components may be used in forming force sensors (by converting applied force into electrical signals for processing by control circuitry 14) and haptic output devices (by converting electrical signals from control circuitry 14 into forces applied to the user's hand). An illustrative piezoelectric device is shown in FIG. 11. Piezoelectric device 60 of FIG. 11 has a support structure such as support structure 68 with a beam-shaped portion such as portion 66. Piezoelectric layers 62 and 64 may be formed on opposing surfaces of beam portion 66. In a force sensor, bending of beam 66 due to applied force will induce compressive stress in layer 62 and tensile stress in layer 64, which can be measured and evaluated using circuitry 14 to produce a force reading. In a haptic output device, voltages may be applied to layers 62 and 64 by control circuitry 14 that cause layer 62 to contract and that cause layer 64 to expand, thereby deflecting beam portion 66 as shown in FIG. 12. If desired, piezoelectric components such as component 60 may have other shapes such as the illustrative disk shape of FIG. 12. In a force sensor with this type of arrangement, applied force to component 60 along axis 70 may produce compressive and tensile stresses in layers 62 and 64 that can be measured by control circuitry 14. In a haptic output device with this type of arrangement, applied electrical signals to layers 62 and 64 can be used to deflect component 60 up or down along axis 70.

Figure 13:
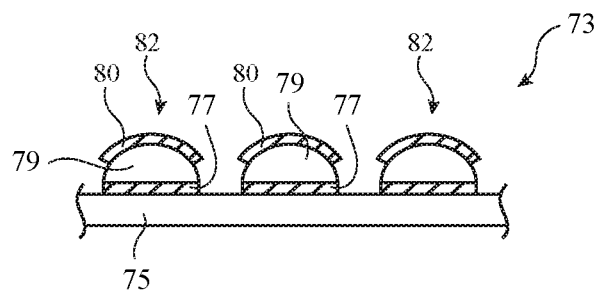
FIG. 13 a cross-sectional side view of an illustrative capacitive force sensor in accordance with an embodiment.

Capacitive sensing techniques may be used to measure force. Consider, as an example, the capacitive force sensor of FIG. 13. Capacitive force sensor 73 has a substrate such as substrate 75 (e.g., a flexible or rigid printed circuit, etc.). One or more capacitive force sensor elements 83 may be formed on substrate 75. For example, a one-dimensional or two-dimensional array of force sensor elements 83 may be formed on substrate 75 that are coupled to capacitive measurement circuitry in control circuitry 14 using signal lines formed from metal traces on substrate 75. Each capacitive force sensor element 83 may have capacitive force sensing electrodes such as electrodes 77 and 80 separated by a compressible material 79 (e.g., polymer foam, an elastomeric material such as silicone, etc.). Control circuitry 14 can measure the capacitance between the pair of electrodes in each element 83. In response to applied force on a given element 83, compressible material 79 in that element will become thinner and the electrode spacing will reduce, leading to an increase in capacitance that control circuitry 14 can measure to determine the magnitude of the applied force.

In addition to or instead of using piezoelectric components for force sensing and/or providing haptic output, and in addition to or instead of using capacitive force sensor arrangements for force sensing, device 10 may use other force sensing and/or haptic output devices. For example, force may be sensed using soft piezoelectric polymers, microelectromechanical systems (MEMs) force sensors, a strain gauge (e.g., a planar strain gauge mounted to the surface of portion 42), resistive force sensors, optical sensors that measure skin color changes due to pressure variations, and/or other force sensing components. Haptic output devices may be based on electromagnetic actuators such as linear solenoids, motors that spin asymmetrical masses, electroactive polymers, actuators based on shape memory alloys, pneumatic actuators, and/or other haptic output components.

Figure 14:
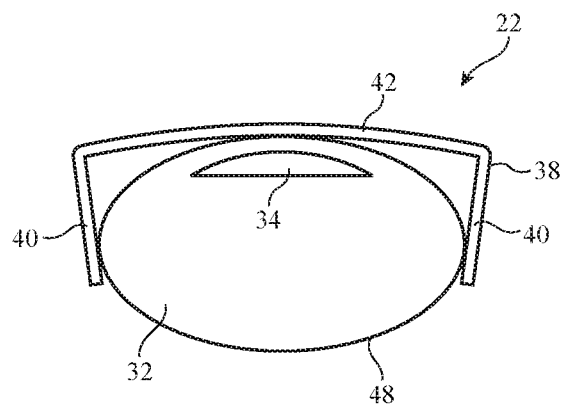
FIGS. 14, 15, and 16 are views showing illustrative mounting arrangements for finger-mounted devices in accordance with embodiments.
Figure 15:
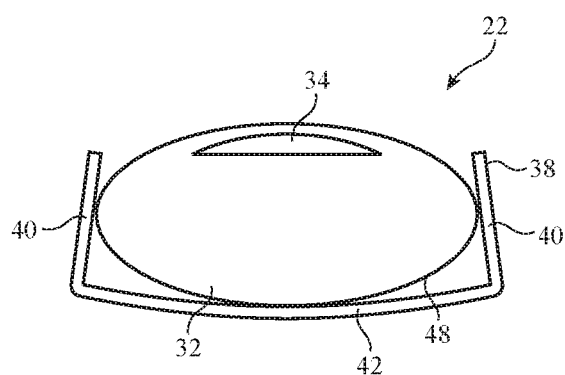
Figure 16:
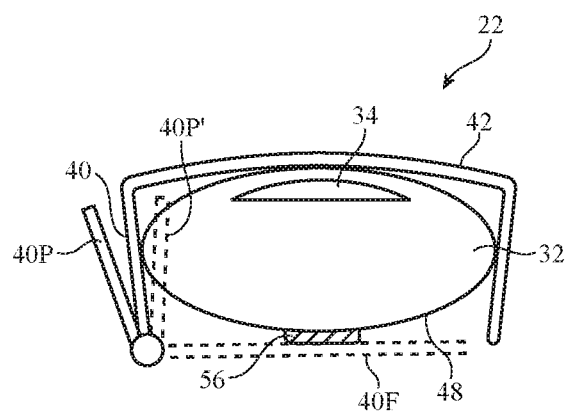

As shown in FIG. 14, unit 22 may be worn in a configuration in which portion 42 is adjacent to fingernail 34 and in which finger pad 48 is exposed. Unit 22 may be worn in this way when it is desired to maximize the user's ability to feel objects in the user's environment. FIG. 15 shows how unit 22 may be worn in a flipped configuration in which unit 22 is upside down in comparison to the orientation of FIG. 14 and in which portion 42 is adjacent to finger pad 48. Unit 22 may be worn in this way to enhance haptic coupling between haptic output component(s) on body 38 and finger pad 48 (e.g., when device 10 is being used in a virtual reality system and in which haptic output is being provided to a user in the absence of a user's actual touching of external surfaces). FIG. 16 shows how sidewall portions of unit 22 may have a rotatable flap such as flaps 40P or 40P'. The flap may rotate into position 40F (e.g., a position in which a haptic output device or other component 56 is adjacent to finger pad 48).

Figure 17:
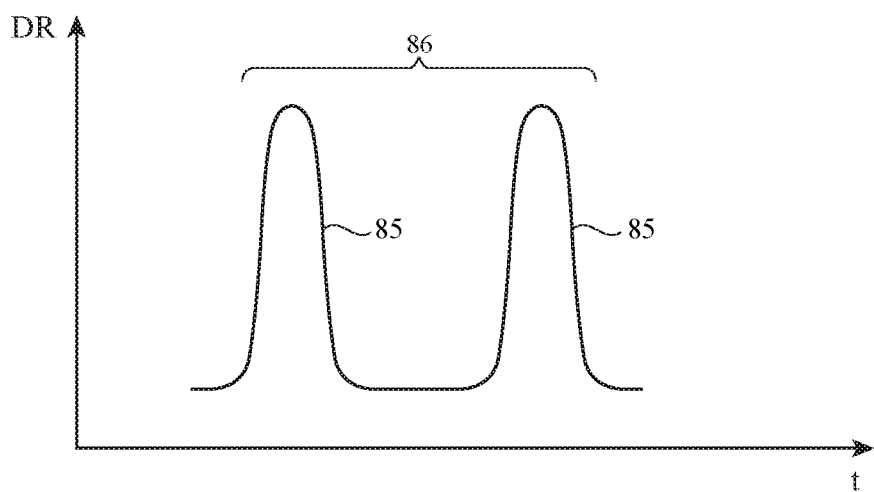
FIG. 17 is a graph of illustrative haptic output drive signals that may be provided to a haptic output device in a finger-mounted device in accordance with an embodiment.

Haptic output may be provided in the form of one or more pulses in the displacement of the haptic output device(s) of unit 22. FIG. 17 is a graph of an illustrative drive signal DR of the type that may be used in controlling a haptic output device in unit 22. In the example of FIG. 17, the drive signal includes a pair of closely spaced pulses 85 (e.g., two pulses 85 that occur at a rate of about 100-300 Hz, at least 150 Hz, less than 250 Hz, or other suitable frequency). There are two pulses in the group of pulses (group 86) of FIG. 17, but fewer pulses or more pulses may be included in the drive signal DR, if desired. Human fingers typically exhibit sensitivity to signals at 1-1000 Hz and are particularly sensitive to signals in the range of 1-300 Hz. Drive signals DR at other frequencies may, however be used if desired. Each pulse 85 may have the shape of a truncated sinusoidal wave, a Gaussian shape, or other suitable shape.

Figure 18:
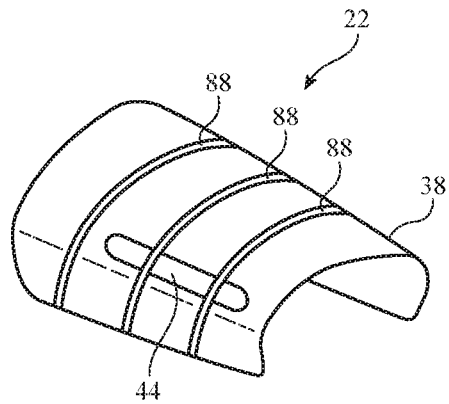
FIG. 18 is a perspective view of an illustrative finger-mounted unit with wires that form elongated frame structures spanning the width of the unit in accordance with an embodiment.

FIG. 18 is a perspective view of an illustrative finger-mounted device arrangement in which unit 22 has frame members 88 that help support other portions of body 38. Frame members 88 may be elongated structures such as deformable metal wires that overlap a deformable structure such as a layer of plastic or sheet metal. The presence of frame members 88 may help allow a user to controllably deform body 38 to produce a satisfactory friction fit of body 38 onto the tip of the user's finger 32.

Figure 19:
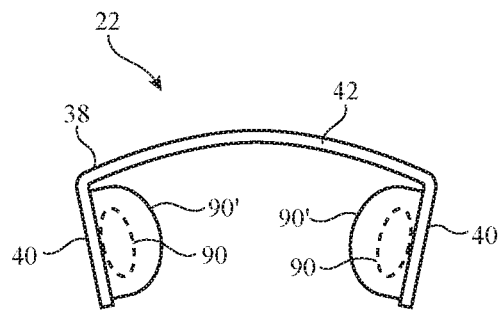
FIG. 19 is a view of an illustrative finger-mounted unit with pneumatically actuated finger grippers in accordance with an embodiment.

In the example of FIG. 19, pneumatic components 90 have been formed on the inner surfaces of sidewall portions 40 of body 38. When inflated, pneumatic components 90 (e.g., balloons) expand to position 90', thereby helping to hold unit 22 on a user's finger.

Figure 20:
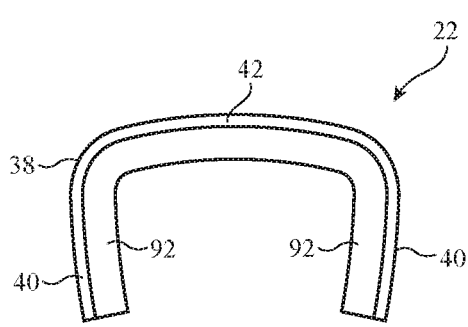
FIG. 20 is a view of an illustrative finger-mounted device having a body member lined with a compressible material such as foam or elastomeric polymer in accordance with an embodiment.

FIG. 20 is a view of an illustrative configuration for unit 22 in which a layer (layer 92) of foam or other compressible material (e.g., silicone or other elastomeric material) has been placed on the inner surfaces of sidewall portions 40 and portion 42 of body 38. When unit 22 is placed on a user's finger, compressible layer 92 can conform to the shape of the user's finger to help hold unit 22 on the user's finger.

Figure 21:
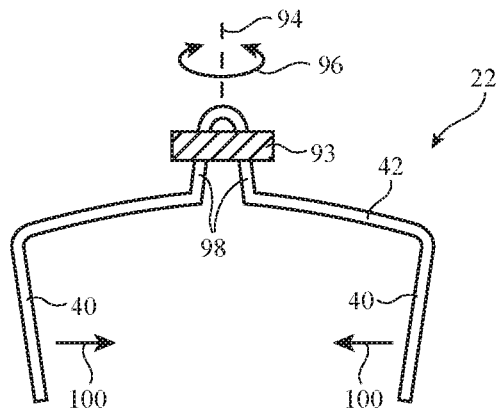
FIG. 21 is a view of an illustrative finger-mounted device with an adjustable screw that controls the width of the body of the finger-mounted device in accordance with an embodiment.

FIG. 21 shows how a threaded fastener such as nut 93 may be used in adjusting the width of body 38 to help hold body 38 on a user's finger. Nut 93 may be received on threads on portion 98 of body portion 42. When nut 93 is rotated in directions 96 about axis 94, portions 98 of body portion 42 will be pulled together or pressed apart, depending on the direction of rotation of nut 93. When portions 98 are pulled towards each other, body sidewall portions 40 will be biased inwardly in directions 100, thereby reducing the separation distance between body sidewall portions 40 and securing unit 22 on the user's finger.

Figure 22:
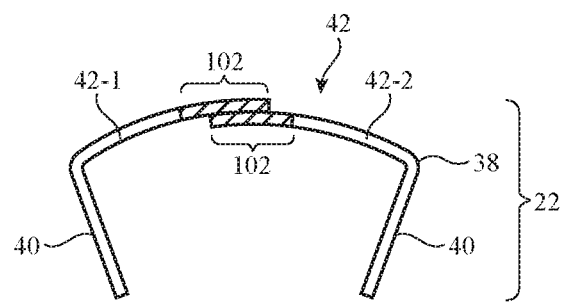
FIG. 22 is a view of an illustrative finger-mounted device with sliding body members that are coupled to each other by magnetic attraction in accordance with an embodiment.

In the example of FIG. 22, unit 22 has portions that slide with respect to each other. In particular, body portion 42 may have a first portion such as portion 42-1 that slides relative to a second portion such as portion 42-2 to adjust the width of unit 22 and therefore the separation distance of sidewall portions 40 to a comfortable size. Areas 102 of portions 42-1 and 42-2 may exhibit magnetic attraction that holds portions 42-1 and 42-2 together and helps secure unit 22 on a user's fingers in a desired configuration.

Figure 23:
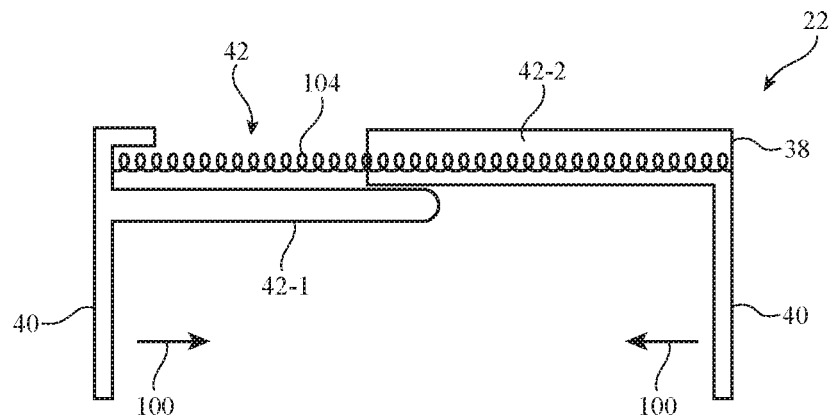
FIG. 23 is a view of an illustrative finger-mounted device with a spring to adjust the width of the body of the device in accordance with an embodiment.

FIG. 23 shows how a biasing structure such as spring 104 can pull portions 42-1 and 42-2 towards each other in directions 100 to secure unit 22 on the user's finger.

Figure 24:
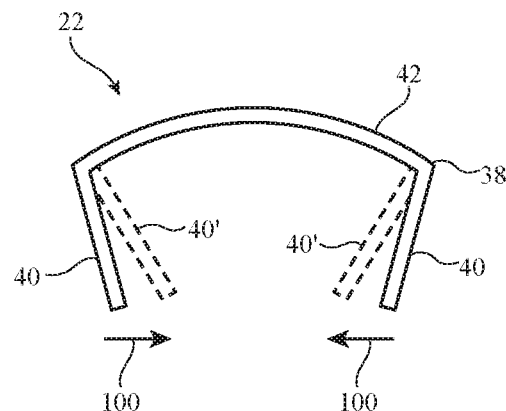
FIG. 24 is a view of an illustrative finger-mounted device with a deformable body in accordance with an embodiment.
Figure 25:
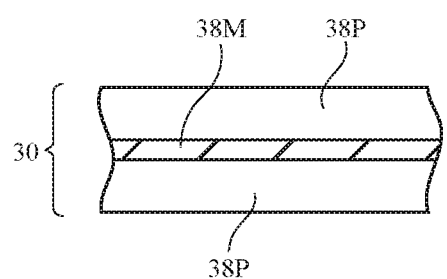
FIG. 25 is a cross-sectional side view of an illustrative polymer-coated deformable metal body member for a finger-mounted device in accordance with an embodiment.

FIG. 24 is a cross-sectional side view of unit 22 in an illustrative configuration in which body 38 is formed from deformable structures such as deformable metal layer(s). With this type of arrangement, wall portions 40 can be bent inwardly in directions 100 to positions such as positions 40' when it is desired to secure unit 22 on a finger of the user. Body 38 in this type of arrangement may include a metal layer that coated with elastomeric material. As shown in FIG. 25, for example, body 38 may include central metal layer 38M and polymer coating layers 38P.

Figure 26:
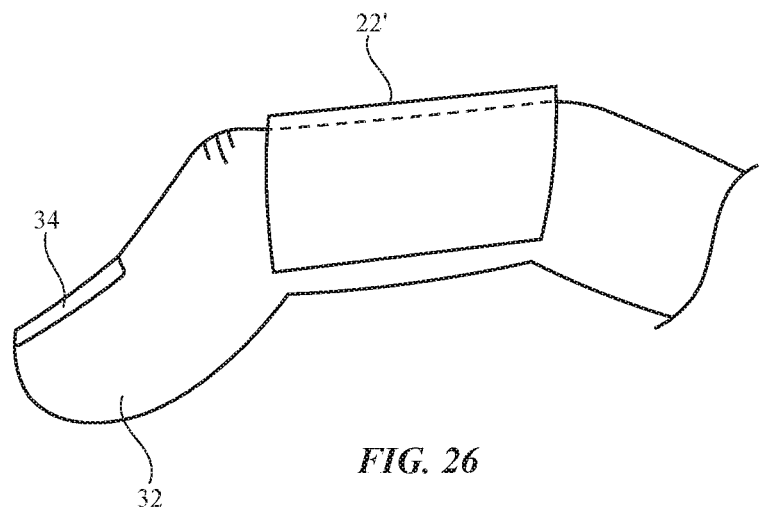
FIG. 26 is a side view of an illustrative finger-mounted device being worn on a finger at a location other than the tip of the finger in accordance with an embodiment.

FIG. 26 is a side view of an illustrative finger-mounted unit (unit 22') in a location that is on finger 32 but not overlapping fingernail 34 at the tip of finger 32. Device 10 may have one or more finger-mounted units and these units may, in general, be located at the user's fingertips, at other locations on the user's fingers 32, etc.

Figure 27:
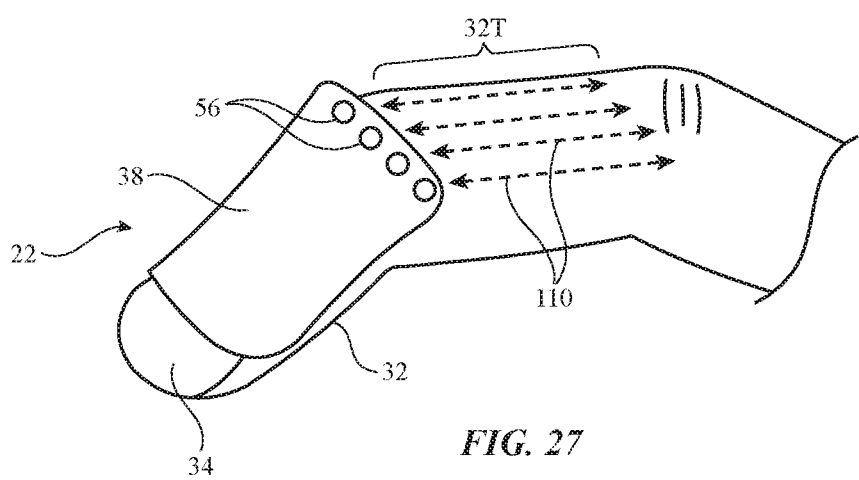
FIG. 27 is a side view of an illustrative finger-mounted device with optical sensors for gathering touch input from the upper surface of a user's finger in accordance with an embodiment.

FIG. 27 shows how components 56 may include optical sensors that can gather touch input from an area such as area 32T on the back of user's finger 32. The optical sensors may include light-emitting diodes, lasers, or other light-emitting components (e.g., infrared light-emitting diodes) and may include light-detecting components such as solid state light detectors (e.g., photodiodes, phototransistors, etc.). The light-emitting components may emit light along paths 110 and the light-detecting components may detect reflected light along paths 110 due to the presence of a user's fingertip or other external object that intersects one of these paths 110. Paths 110 may be parallel to each other and/or may include angled paths (e.g., to facilitate triangulation). By processing the optical sensor signals from the optical sensors in this type of arrangement, control circuitry 14 can measure the location of an object in area 32T (e.g., in one or two dimensions). This allows area 32T to be used as a miniature portable track pad.

Figure 28:
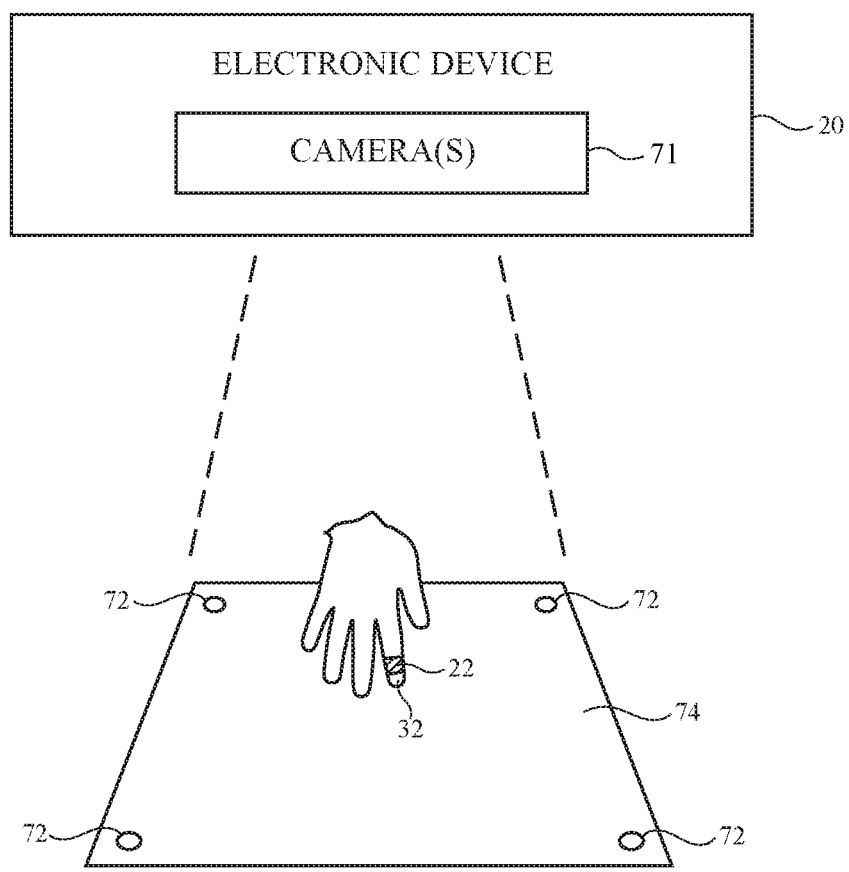
FIG. 28 is a diagram showing how markers may be used in calibrating a system in which a finger-mounted device is used in accordance with an embodiment.

As shown in FIG. 28, external equipment such as electronic device 20 in system 12 may contain sensors such as one or more cameras 71 (e.g., visual light cameras, infrared cameras, etc.). Electronic device 20 may, as an example, be a head-mounted device such as augmented reality (mixed reality) or virtual reality googles (or glasses, a helmet, or other head-mountable support structures). Visual markers 72 may be placed in the user's working environment. Markers 72 may be, for example, passive visual markers such as bar codes, cross symbols, or other visually identifiable patterns and may be applied to a tabletop or other work surface. If desired, markers 72 may be formed as part of a work surface pad such as pad 74. Markers may also be placed on finger-mounted device(s) 10 (see, e.g., unit 22 of FIG. 28).

Markers 72 may, if desired, include light-emitting components (e.g., visual light-emitting diodes and/or infrared light-emitting diodes modulated using identifiable modulation codes) that are detected using cameras. Markers 72 may help inform system 10 of the location of the user's virtual work surface and one or more of the user's fingers as a user is interacting with a computer or other equipment in system 12.

Visual markers 72 on units 22 and/or inertial measurement units in units 22 (e.g., accelerometers, compasses, and/or gyroscopes) may be used in tracking the user's finger locations (e.g., the locations of finger-mounted units 22) relative to markers 72 on the user's work area. At the same time, system 10 may display associated visual content for the user. The user may interact with the displayed visual content by supplying force input, motion input (e.g., air gestures), taps, shearing force input, and other input gathered from units 22 by inertial measurement units in units 22 and/or force sensors and other sensors in device(s) 10.

For example, information on the location of finger-mounted units 22 relative to markers 72 may be gathered by control circuitry in device 20 or other electronic equipment in system 10 (e.g., a computer, cellular telephone, or other electronic device coupled to device 20) during operation of system 10 while monitoring units 22 for force input, gesture input (e.g., taps, three-dimensional air gestures, etc.) that indicate that a user has selected (e.g., highlighted), moved, or otherwise manipulated a displayed visual element and/or provided commands to system 12. As an example, a user may make an air gesture such as a left hand wave to move visual content to the left. System 10 may use inertial measurement units in units 22 to detect the left hand wave gesture and can move visual elements being presented to the user with a display in device 20 in response to the left hand wave gesture. As another example, a user may select a visual element in the user's field of view by tapping on that element.

In this way, control circuitry in device 20, and/or other control circuitry in system 10 may allow a user to manipulate visual elements being viewed by the user (e.g., virtual reality content or other visual content being presented with a head-mounted device such as augmented reality googles or other device 20 with a display). If desired, a camera such as camera 71 may face the eyes of a user (e.g., camera 71 or other visual tracking equipment may form part of a gaze tracking system). The camera and/or other circuitry of the gaze tracking system may monitor the direction in which a user is viewing real-world objects and visual content. As an example, a camera may be used to monitor the point of gaze (direction of gaze) of a user's eyes as the user is interacting with virtual content presented by device 20 and as the user is interacting with real-life content. Control circuitry in device 20, unit 22, or other electronic equipment may measure the amount of time that a user's gaze dwells in particular locations and can use this point-of-gaze information in determining when to select virtual objects. Virtual objects can also be selected when it is determined that a user is viewing a particular object (e.g., by analyzing point-of-gaze information) and when it is determined that a user has made a voice command, finger input, button press input, or other user input to select the particular object that is being viewed. Point-of-gaze information can also be used during drag and drop operations (e.g., to move virtual objects in accordance with movement of the point-of-gaze from one location in a scene to another.

Figure 29:
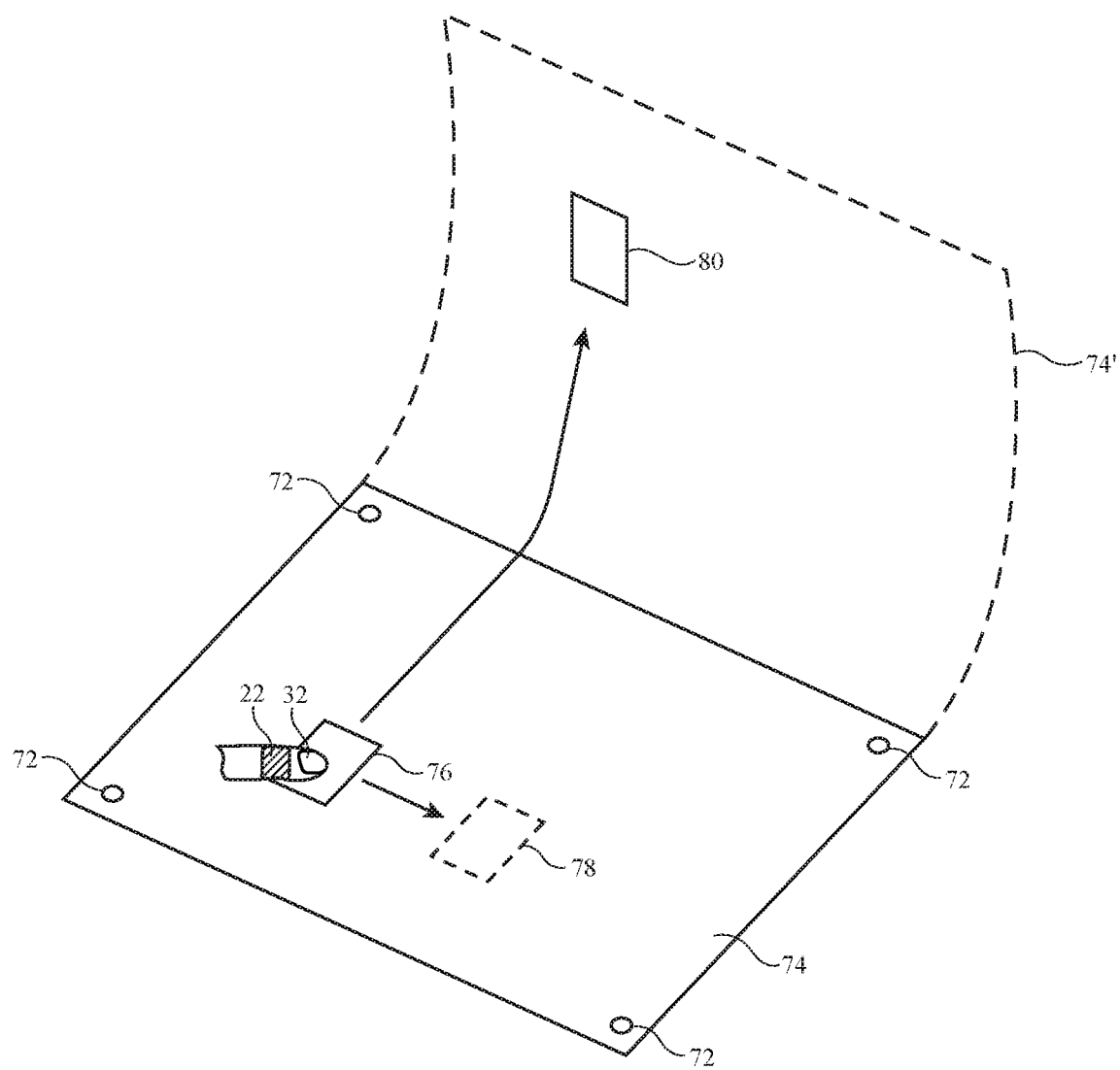
FIG. 29 is a diagram showing how visual elements can be manipulated by a user who is wearing a finger-mounted device in accordance with an embodiment.

FIG. 29 is a diagram showing how visual elements can be manipulated by a user who is wearing finger-mounted device 22 on finger 32. Visual elements such as illustrative element 76 (e.g., an icon representing a desktop application, a file folder, a media file or other file, or other information) may be displayed using a display in device 20. Workspace 74 may have markers 72, if desired. A user may select visual items using taps, force input, persistent touch input, air gestures, and/or other user input that is detected using unit(s) 22 and/or other equipment in system 12 such as cameras in device 20.

Visual items such as illustrative element 76 can be selected (e.g., to launch an application, to highlight an item, etc.), moved, deleted, marked, and/or may otherwise be manipulated by a user using gestures (e.g., drag and drop gestures, etc.) and other user input. For example, a user may drag and drop visual element 76 to location 78 on workspace 74 using the tip of finger 32 as an input device (while the location of the tip of finger 32 is monitored using unit 22). Unit 22 on finger 32 may supply haptic output (e.g., feedback that creates a virtual detent as a user drags element 76 past a predetermined boundary). This feedback may be accompanied by visual feedback (e.g., changes in the color and other aspects of the appearance of element 76 that are synchronized with haptic feedback). If desired, device 20 may display visual elements in a virtual workspace that extends upwards in front of (and, if desired, to the left and right sides of and/or behind) the user, as shown by virtual workspace 74'. A user may drag and drop visual element 76 to a location in virtual workspace 74' (e.g., to place element 76 in location 80). Items in workspace 74' may be manipulated using air gestures or other input (e.g., voice input, etc.). For example, a user may use a rightwards swipe to move items in workspace 74' to the right.

As the user interacts with virtual content using unit 22, the user may contact a table surface or other surface with the surface of finger 32. For example, the finger pulp of finger pad 48 at the bottom of the tip of finger 32 may contact the table surface and may be compressed by the force imparted by finger 32. To lessen fatigue and improve a user's experience when providing finger press input, the forces imposed on a user's fingers as the user is providing input to an electronic device can be modified using components coupled to a user's finger and/or components in the electronic device. As an example, components in a finger-mounted device such as unit 22 may be used to help soften the impact between a user's finger and the input surface (e.g., a surface associated with workspace 74).

An unmodified finger impact event may be characterized by an abrupt force-versus-displacement profile (e.g., rapidly rising force on a user's finger when traveling a relatively short distance toward an input surface). By modifying these forces, a user may be provided with softer finger-to-input-surface interactions, with finger sensations that mimic the action of clicking on a physical button, and/or other finger sensations. With one illustrative configuration, actuators in unit 22 (e.g., piezoelectric actuators, electromechanical actuators, etc.) can squeeze (or not squeeze) a user's fingertip just before the fingertip touches a surface, thereby selectively modifying the user's experience as the fingertip contacts the surface. If, for example, actuators on the left and right side of unit 22 squeeze inwardly on finger 32 just before finger pad 48 touches surface 46 and thereby cause the pulp of finger 32 to protrude towards surface 46 prior to contact, the user may experience a softer impact with surface 46 than if the actuators do not squeeze inwardly on the finger. Modifications such as these may be made dynamically as a user interacts with virtual content.

Figure 30:
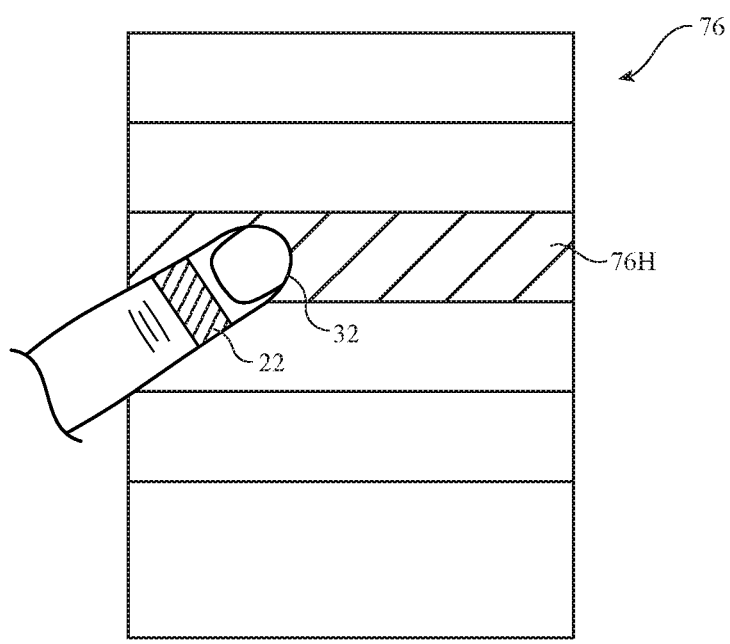
FIG. 30 is a diagram in which a user is selecting an item in a list using a finger-mounted device in accordance with an embodiment.

FIG. 30 shows how visual element 76 may be a list containing multiple items. A desired item in the list may be selected by causing finger 32 to hover (linger) over the desired item for more than a predetermined amount of time (as shown by illustrative selected item 76H). Finger position information gathered by system 10 (e.g., an inertial measurement in unit 22, a camera measuring a marker on a unit 22, etc.) may be used in determining which list items are to be selected, highlighted, etc. Gestures may be used to scroll through items.

Figure 31:
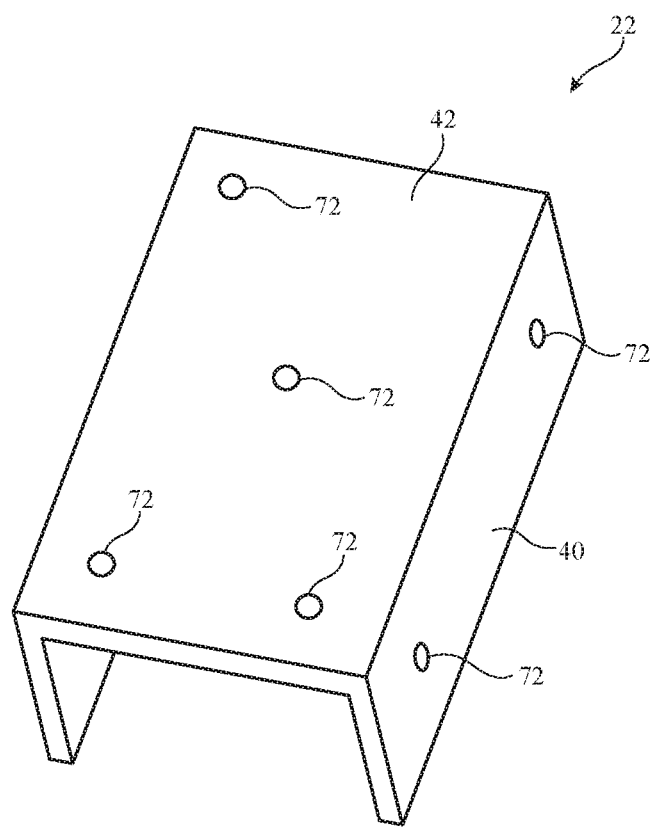
FIG. 31 is a perspective view of an illustrative finger-mounted device with visual markers in accordance with an embodiment.

If desired, system 10 (e.g., cameras in device 20, etc.) can detect the position of units 22 using optical sensing. As shown in FIG. 31, units 22 may include visual markers 72 (e.g., passive markers, visible or infrared light-emitting diodes, etc.). Markers 72 may be placed on portions of unit 22 in device 10 such as portions 42 and 40. Markers 72 may be arranged in a recognizable asymmetrical pattern to help avoid creating ambiguous position data.

Figure 32:
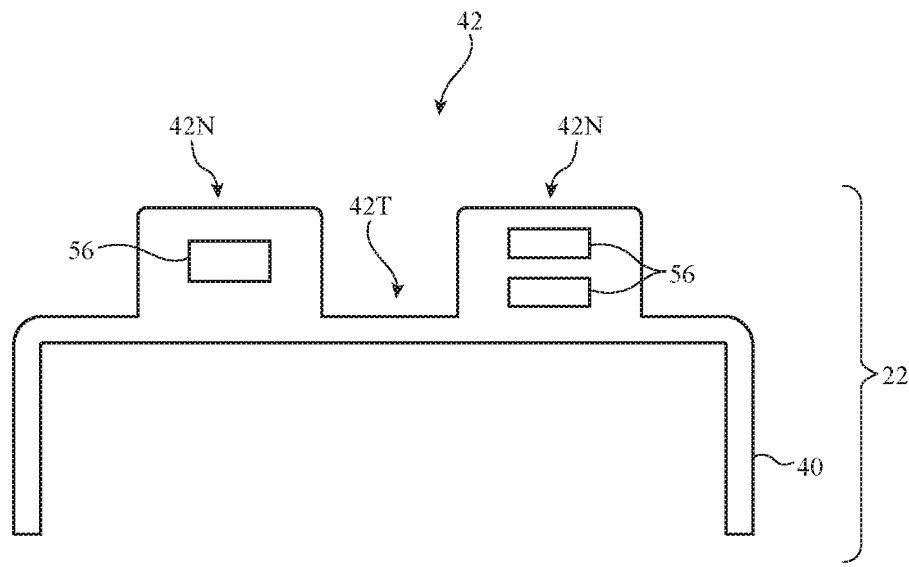
FIG. 32 is a cross-sectional view of an illustrative finger-mounted device with a thinned central region in accordance with an embodiment.

FIG. 32 is a cross-sectional side view of unit 22 in an illustrative configuration in which upper portion 42 has thicker portions 42N in which components 56 have been housed and a thinner portion to facilitate bending such as thinner portion 42T. Thinner portion 42T may be formed from a flexible material such as metal, polymer, and/or other materials and may be interposed between portions 42N.

Figure 33:
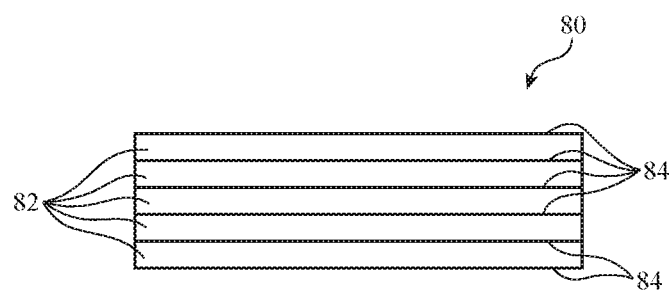
FIG. 33 is an illustrative layer with an electrically adjustable flexibility for use in securing a finger-mounted device to a user's finger in accordance with an embodiment.

If desired, thinner portion 42T and/or other portions of unit 22 may be formed from components with adjustable flexibility. An illustrative component with adjustable flexibility is shown in FIG. 33. As shown in FIG. 33, component 80 (e.g., a layer with an electrically adjustable flexibility) may have multiple layers 82 of electroactive polymer interleaved with electrodes 84. When a small signal or no signal is applied to electrodes 84, layers 82 can slip with respect to each other and component 80 can flex. When a larger signal is applied to electrodes 84, layers 82 will lock into place and component 80 will not be flexible. Component 80 may be located in portion 42T of unit 22 of FIG. 32. When no voltage is applied, portion 42T can bend, allowing unit 22 to be placed over a user's finger. After placing unit 22 on a user's finger, unit 22 can be locked in place on the finger by applying a control signal to electrodes 84.

The foregoing is merely illustrative and various modifications can be made to the described embodiments. The foregoing embodiments may be implemented individually or in any combination.

What is claimed is:

1. A finger-mounted device configured to be worn on a finger of a user, the finger having a fingertip with a fingernail on one surface and a finger pad on an opposing surface, the finger-mounted device comprising:
    a body configured to be coupled to the fingertip, wherein the body has a first portion that covers the fingernail of the fingertip, a second portion that extends down a first side portion of the fingertip, and a third portion that extends down a second side portion of the fingertip, wherein the body leaves the finger pad of the fingertip exposed, and wherein the second and thirs portions are configured to move relative to one another to attach to the fingertip;
    a sensor in the second portion of the body;
    a haptic output device coupled to the body; and
    control circuitry configured to provide haptic output to the user's finger using the haptic output device.

2. The finger-mounted device defined in claim 1 further comprising an accelerometer coupled to the body, wherein the control circuitry is configured to gather finger tap input with the accelerometer.

3. The finger-mounted device defined in claim 2 wherein the sensor comprises a force sensor, wherein the control circuitry includes wireless communications circuitry configured to wirelessly transmit the finger tap information and force information from the force sensor that is associated with finger pressure applied with the finger to a surface.

4. The finger-mounted device defined in claim 1 further comprising an optical sensor coupled to the body.

5. The finger-mounted device defined in claim 4 further comprising a light-emitting diode coupled to the body.

6. The finger-mounted device defined in claim 1 wherein the finger-mounted device further comprises a biasing structure coupled between the second and third portions that is configured to pull the second and third portions together.

7. The finger-mounted device defined in claim 1 wherein the body comprises a deformable metal layer coated with polymer.

8. The finger-mounted device defined in claim 1 wherein the body comprises magnetic portions that couple the second and third portions together.

9. The finger-mounted device defined in claim 1 further comprising a compressible layer on an inner surface of the body.

10. The finger-mounted device defined in claim 1 wherein the sensor comprises a force sensor and wherein the control circuit is configured to gather force measurements with the force sensor that are associated with pressure applied by the finger.

11. The finger-mounted device defined in claim 10 wherein the control circuit is configured to provide the haptic output based on the force measurements.

12. The finger-mounted device defined in claim 10 wherein the second and third portions of the body form respective first and second sidewall portions, wherein the first portion couples the first and second sidewall portions to each other, and wherein the haptic output device is mounted to one of the first and second sidewall portions.

13. The finger-mounted device defined in claim 10 wherein the force sensor comprises a piezoelectric force sensor.

14. The finger-mounted device defined in claim 10 wherein the force sensor comprises a capacitive force sensor.

15. The finger-mounted device defined in claim 1 wherein the haptic output device comprises a piezoelectric haptic output device.

16. The finger-mounted device defined in claim 1 wherein the haptic output device is configured to gather force sensor input for the control circuitry.

17. The finger-mounted electronic device defined in claim 1 wherein the sensor comprises a force sensor, the finger-mounted device further comprising:
    an accelerometer, wherein the control circuitry is configured to drive the haptic output device with pulses at a frequency of 1-300 Hz in response to detection of output from a selected one of: the force sensor and the accelerometer.

18. The finger-mounted device defined in claim 1 wherein the haptic output device is configured to provide force sensor measurements to the control circuitry.

19. The finger-mounted device defined in claim 1 wherein the haptic output comprises haptic output selected from the group consisting of: virtual reality haptic output and augmented reality haptic output.

20. The finger-mounted device defined in claim 1 wherein the sensor is selected from the group consisting of: an optical sensor and an accelerometer.

21. A finger-mounted device configured to be worn on a fingertip of a user, the finger-mounted device comprising:
   a force sensor;
   a haptic output device;
   an accelerometer;
   a fingertip unit having a support structure with a top portion that overlaps a fingernail of the fingertip and two side portions that extend down first and second opposing sides of the fingertip while leaving a finger pad of the fingertip exposed, wherein the two side portions are configured to move relative to one another to attach to the fingertip, wherein one of the two side portions of the support structure is coupled to the force sensor, and wherein the support structure is coupled to the haptic output device and the accelerometer; and
   control circuitry configured to gather information from the force sensor and the accelerometer and configured to supply drive signals to the haptic output device.

22. The finger-mounted device defined in claim 21 wherein the control circuitry comprises wireless circuitry with which the control circuitry wirelessly transmits the information from the force sensor and the accelerometer.

23. The finger-mounted device defined in claim 21 wherein the support structure has a U-shaped cross-sectional profile.

24. Apparatus, comprising:
   a finger-mounted support structure having a U-shaped cross-sectional profile with first and second portions that form sidewalls that extend down side portions of a user's fingertip while leaving a finger pad of the fingertip exposed, wherein the sidewalls are coupled by a third portion and wherein the first and second portions are configured to move relative to one another to attach to the fingertip;
   a force sensor located on the first portion;
   an accelerometer located on the third portion; and
   a haptic output device coupled to the finger-mounted support structure.

25. The apparatus defined in claim 24 wherein the finger-mounted support structure has a deformable metal layer configured to deform to adjust a separation distance between the first and second portions.

26. The apparatus defined in claim 24 wherein the third portion has portions that slide with respect to each other to adjust a separation distance between the first and second portions.

27. The apparatus defined in claim 24 wherein the third portion includes a component with electrically adjustable flexibility.

28. The apparatus defined in claim 24 further comprising an electronic device with a camera that tracks movements of the finger-mounted support structure and that is configured to display visual elements.

29. The apparatus defined in claim 28 wherein the electronic device comprises a head-mounted device with a display that displays the visual elements and wherein the head-mounted device is configured to move the displayed visual elements on the display based on information from the accelerometer.

30. The apparatus defined in claim 28 wherein the electronic device comprises a head-mounted device with a display that displays the visual elements and wherein the head-mounted device is configured to move the displayed visual elements on the display based on information from the force sensor while supplying the haptic output with the haptic output device as feedback.

31. The apparatus defined in claim 28 further comprising a visual marker that is tracked using the camera.

32. The apparatus defined in claim 31 wherein the visual marker comprises an infrared light-emitting diode on the finger-mounted support structure.

* * * * *

UNITED STATES PATENT AND TRADEMARK OFFICE
CERTIFICATE OF CORRECTION

PATENT NO. : 10,838,499 B2
APPLICATION NO. : 16/015043
DATED : November 17, 2020
INVENTOR(S) : Paul X. Wang et al.

Page 1 of 1

It is certified that error appears in the above-identified patent and that said Letters Patent is hereby corrected as shown below:

In the Claims

Column 13, Line 65, in Claim 1, "the second and thirs portions" should read -- the second and third portions --

Signed and Sealed this
Ninth Day of February, 2021

Drew Hirshfeld
*Performing the Functions and Duties of the
Under Secretary of Commerce for Intellectual Property and
Director of the United States Patent and Trademark Office*